E. BLACKMAN,
Assignor, by mesne assignments, to himself and A. H. BYINGTON.
Base for Lamp-Globes.
No. 8,990. Reissued Dec. 9, 1879.
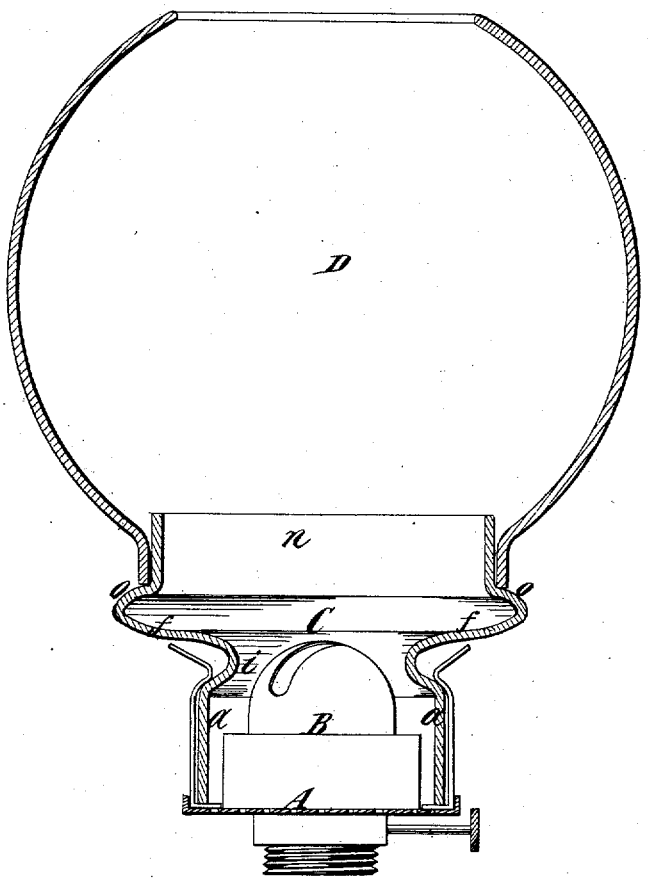
*Witnesses:*
Chandler Hall
F. J. Keane
*Inventor:*
Ebenezer Blackman
by his Attorney
Edwin H. Brown
N. PETERS, PHOTO-LITHOGRAPHER, WASHINGTON, D. C.

UNITED STATES PATENT OFFICE.

EBENEZER BLACKMAN, OF BROOKLYN, N. Y., ASSIGNOR, BY MESNE ASSIGNMENTS, TO HIMSELF AND A. HOMER BYINGTON, OF NORWALK, CONN.

IMPROVEMENT IN BASES FOR LAMP-GLOBES.

Specification forming part of Letters Patent No. 196,286, dated October 23, 1877; Reissue No. 8,990, dated December 9, 1879; application filed November 4, 1879.

*To all whom it may concern:*

Be it known that I, EBENEZER BLACKMAN, of Brooklyn, in the county of Kings and State of New York, have invented certain new and useful Improvements in Lamps, of which the following is a specification.

My invention relates particularly to coal-oil lamps; and the invention consists in the combination, in a lamp, of a base made of material which will permit the passage of light through it, a burner provided with a gallery, in which the lower end of the said base fits, so as to receive within it the air ascending through the air-distributer, and a globe or shade fitted to and supported on the said base, so that said base and globe or shade will induce the requisite draft of air to the burner without the aid of a chimney.

It also consists in various other features, hereinafter described and claimed.

The accompanying drawing represents a transverse vertical section of a base and a globe or shade applied to a coal-oil burner and embodying my invention.

C designates a base, represented as made of clear glass, having a tubular body, *a*, adapted to fit around the cone or deflector B of a coal-oil burner, and in a gallery in proximity to the air-distributer A thereof, and having, also, an annular contraction, *i*, a laterally-extending flange, *f*, a shoulder, *o*, at its outer extremity, and an annular upturned rim, *n*.

D designates a globe or shade fitting upon the base C, it being held in place by the rim *n* and the shoulder *o*, as represented. This globe and base, when thus combined, subserve the purpose of a chimney, and induce the requisite draft of air to the burner without the aid of a chimney, and at the same time one is enabled to avail himself of all the advantages of a globe or shade—such, for instance, as having its surface ground to modify the glare of the light, or figured for the purpose of ornamentation, or both combined.

The tubular body of the base holds the air ascending through the air-distributer of the burner around the cone of the burner, keeping the latter cool. The contraction *i* tends to direct the air to the base of the flame, and the laterally-extending flange, in connection with the globe or shade, affords an expanded chamber for the flame. When the surface of the globe or shade is so constituted as to modify the light it more or less shades the eyes from the glare of the flame.

All that is required in order to insure the fitting of the globe or shade and base together is to have the rim *n* of the base and the lower opening of the globe made to correspond in size. It is obvious that the two parts so fitted have a lap-joint, by which the tendency of air to enter their interior between them is greatly lessened, if not entirely obviated.

What I claim as my invention, and desire to secure by Letters Patent, is—

1. In a lamp, the combination of a base made of material which will permit the passage of light through it, a burner provided with a gallery in which the lower end of the said base fits, so as to receive within it the air ascending through the air-distributer, and a globe or shade fitted to and supported on the said base, so that said base and globe or shade will induce the requisite draft of air to the burner without the aid of a chimney, substantially as specified.

2. In a lamp, the combination of a base made of material that will permit the passage of light through it, and consisting of a tubular body and a laterally-extending flange, and a globe or shade fitted thereto, so that it will, in conjunction with the base, serve to induce a draft of air to the burner of the lamp.

3. In a lamp, the combination of a base made of material that will permit of the passage of light through it, and consisting of a tubular body, a laterally-extending flange, and an upturned rim, and a globe or shade fitted thereto, so that it will, in conjunction with the base, serve to induce a draft of air to the burner of the lamp without the aid of a chimney.

4. In a lamp, the combination of a base made of material that will permit of the passage of light through it, and consisting of a tubular body, a laterally-extending flange, and a contraction or inward indentation at the junction of the said body and flange, and a globe or shade fitted thereto, so that it will, in conjunction with the said base, serve to induce a draft of air to the burner of the lamp without the aid of a chimney.

5. In a lamp, the combination of a base made of material that will permit the passage of light through it, and consisting of a tubular body, a laterally-extending flange, a contraction or inward indentation at the junction of the said body and flange, and an upturned rim on the flange, and a globe or shade fitted thereto, so that it will, in conjunction with the said base, serve to induce a draft of air to the burner of the lamp without the aid of a chimney.

6. The base C, constructed and adapted for use on a coal-oil burner, substantially as shown and described, provided with the neck or rim *n* and shoulder *o*, whereby it is adapted for convenient use with a globe, D, as set forth.

7. The base C, provided with the tubular body *a*, projection *o*, and vertical flange or neck or rim *n*, in combination with the globe D, substantially as shown and described.

EBENEZER BLACKMAN.

Witnesses:
T. J. KEANE,
CHANDLER HALL.